US011675063B2

(12) United States Patent
Michaels et al.

(10) Patent No.: US 11,675,063 B2
(45) Date of Patent: Jun. 13, 2023

(54) BEAM DISPLACEMENT APPARATUS FOR LIGHT DETECTION AND RANGING

(71) Applicant: OURS Technology, LLC, Mountain View, CA (US)

(72) Inventors: Andrew Steil Michaels, Santa Clara, CA (US); Sen Lin, Santa Clara, CA (US)

(73) Assignee: OURS TECHNOLOGY, LLC, Mountain View, CA (US)

( * ) Notice: Subject to any disclaimer, the term of this patent is extended or adjusted under 35 U.S.C. 154(b) by 0 days.

(21) Appl. No.: 17/463,860

(22) Filed: Sep. 1, 2021

(65) Prior Publication Data

US 2022/0075043 A1 Mar. 10, 2022

Related U.S. Application Data

(60) Provisional application No. 63/074,834, filed on Sep. 4, 2020, provisional application No. 63/074,837, filed on Sep. 4, 2020.

(51) Int. Cl.
*G01S 7/4912* (2020.01)
*G01S 7/4861* (2020.01)
(Continued)

(52) U.S. Cl.
CPC .......... *G01S 7/4916* (2013.01); *G01S 7/4817* (2013.01); *G01S 7/4861* (2013.01); *G01S 7/499* (2013.01);
(Continued)

(58) Field of Classification Search
CPC ...... G01S 7/499; G01S 17/931; G01S 7/4817; G01S 17/32; G01S 17/89; G01S 17/894; B60W 60/001; B60W 2420/52
See application file for complete search history.

(56) References Cited

U.S. PATENT DOCUMENTS 7,295,290 B2 11/2007 Yanagisawa et al.
10,754,091 B1 8/2020 Nagarajan
(Continued)

FOREIGN PATENT DOCUMENTS

EP 1640747 A1 3/2006
KR 20180083983 A 7/2018
(Continued)

OTHER PUBLICATIONS

U.S. Appl. No. 17/343,511, filed Unknown, OURS Technology, LLC.
(Continued)

*Primary Examiner* — Luke D Ratcliffe
(74) *Attorney, Agent, or Firm* — Dority & Manning, P.A.

(57) ABSTRACT

A light detection and ranging (LIDAR) system includes a transmitter, a receiving pixel, a rotating mirror, and a beam displacement apparatus. The transmitter is configured to emit a transmit beam. The receiving pixel is configured to receive a returning beam. The rotating mirror is configured to direct the transmit beam to a target and direct the returning beam to the receiving pixel. The beam displacement apparatus is disposed between the receiving pixel and the rotating mirror. The beam displacement apparatus is configured to introduce a displacement to the returning beam to compensate for a spacing between the transmitter and the receiving pixel.

19 Claims, 7 Drawing Sheets

(51) Int. Cl.
*G01S 17/34* (2020.01)
*G01S 17/931* (2020.01)
*G01S 7/481* (2006.01)
*G01S 7/499* (2006.01)
*G01S 17/32* (2020.01)
*B60W 60/00* (2020.01)

(52) U.S. Cl.
CPC .............. *G01S 17/32* (2013.01); *G01S 17/34* (2020.01); *G01S 17/931* (2020.01); *B60W 60/001* (2020.02); *B60W 2420/52* (2013.01)

(56) References Cited

U.S. PATENT DOCUMENTS

| | | | |
|---|---|---|---|
| 2018/0356528 | A1 | 12/2018 | Schaffner et al. |
| 2019/0049985 | A1 | 2/2019 | Doylend |
| 2019/0391243 | A1 | 12/2019 | Nicolaescu |
| 2020/0018854 | A1 | 1/2020 | Hicks et al. |
| 2020/0103502 | A1 | 4/2020 | Talty et al. |
| 2020/0150241 | A1 | 5/2020 | Byrnes et al. |
| 2020/0256960 | A1* | 8/2020 | LaChapelle ............ G01S 7/4817 |
| 2020/0333533 | A1* | 10/2020 | Rogers .................. G01S 7/4812 |
| 2021/0112647 | A1* | 4/2021 | Coleman ................ H05B 47/11 |
| 2021/0382142 | A1* | 12/2021 | Rogers .................... G01S 17/89 |

FOREIGN PATENT DOCUMENTS

| | | |
|---|---|---|
| KR | 20190017451 A | 2/2019 |
| KR | 20190106216 A | 9/2019 |
| WO | 2019084610 A1 | 5/2019 |
| WO | 2020161250 A1 | 8/2020 |
| WO | 2020219145 A1 | 10/2020 |

OTHER PUBLICATIONS

Non-Final Office Action, U.S. Appl. No. 17/463,934, Notification dated Mar. 9, 2022, 12 pages.
Ronen, Ayala et al., "Sensing with polarized LIDAR in Degraded Visibility Conditions Due to Fog and Low Clouds" Sensors 2021, 21, 2510. Https://.doi.org/10/3390/s21072510 13 pgs. Apr. 13, 2021.
International Searching Authority, Patent Cooperation Treaty, Written Opinion of the International Searching Authority, International Application No. PCT/US2021/048924, Notification dated Dec. 7, 2021, 11 pages.
International Searching Authority, Patent Cooperation Treaty, Written Opinion of the International Searching Authority, International Application No. PCT/US2021/048925, Notification dated Dec. 14, 2021, 12 pages.
Non-Final Office Action, U.S. Appl. No. 17/855,535, Notification dated Nov. 3, 2022, 19 pages.

* cited by examiner

BEAM DISPLACEMENT APPARATUS FOR LIGHT DETECTION AND RANGING

CROSS-REFERENCE TO RELATED APPLICATIONS

This application claims priority to U.S. provisional Application No. 63/074,834 filed Sep. 4, 2020, and U.S. provisional Application No. 63/074,837 filed Sep. 4, 2020, which are hereby incorporated by reference.

TECHNICAL FIELD

This disclosure relates generally to optics and in particular to light detection and ranging (LIDAR).

BACKGROUND INFORMATION

Frequency Modulated Continuous Wave (FMCW) LIDAR directly measures range and velocity of an object by directing a frequency modulated, collimated light beam at a target. Both range and velocity information of the target can be derived from FMCW LIDAR signals. Designs and techniques to increase the accuracy of LIDAR signals are desirable.

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment. Autonomous vehicles may include one or more FMCW LIDAR devices for sensing its environment.

BRIEF SUMMARY OF THE INVENTION

Implementations of the disclosure includes a light detection and ranging (LIDAR) system including a transmitter, a receiving pixel, a rotating mirror, and a beam displacement apparatus. The transmitter is configured to emit a transmit beam. The receiving pixel is configured to receive a returning beam. The rotating mirror is configured to direct the transmit beam to a target and direct the returning beam to the receiving pixel. The beam displacement apparatus is disposed between the receiving pixel and the rotating mirror. The beam displacement apparatus is configured to introduce a displacement to the returning beam to compensate for a spacing between the transmitter and the receiving pixel.

In an implementation, the beam displacement apparatus is configured to compensate for a reflection angle difference between the transmit beam and the returning beam reflecting off of the rotating mirror.

In an implementation, the beam displacement apparatus includes a beam displacer element including a birefringent material and the transmit beam has a first polarization orientation as the transmit beam encounters the beam displacement element. The birefringent material introduces the displacement to a second polarization orientation of the returning beam that is orthogonal to the first polarization orientation of the transmit beam.

In an implementation, the beam displacement apparatus includes a beam rotator disposed between the transmitter and the beam displacer element and the beam rotator is configured to rotate a transmit polarization of the transmit beam so that the transmit polarization of the transmit beam is perpendicular to an optical axis of the beam displacer element.

In an implementation, the beam rotator is a switchable beam rotator and the rotating mirror is configured to rotate a first direction and a second opposite direction during regular operation. The switchable beam rotator may be driven to a first retardation value when the rotating mirror is rotating in the first direction and driven to a second retardation value when the rotating mirror is rotating in the second opposite direction.

In an implementation, the first retardation value is 0 degrees and the second retardation value is 90 degrees.

In an implementation, the beam displacement apparatus includes a waveplate disposed between the beam displacement element and the rotating mirror.

In an implementation, the waveplate is a quarter waveplate.

In an implementation, the beam displacement apparatus includes a lens disposed between the beam displacer element and the rotating mirror and the lens is configured to collimate the transmit beam.

In an implementation, the beam displacement apparatus is configured to make the transmitter and the receiving pixel non-coaxial.

In an implementation, the returning beam is the transmit beam reflecting off a target.

In an implementation, the transmit beam has a near-infrared wavelength and the returning beam has the near-infrared wavelength.

Implementations of the disclosure include an autonomous vehicle control system for an autonomous vehicle including a light detection and ranging that includes a LIDAR device and one or more processor configured to control the autonomous vehicle in response to an output of a receiving pixel of the LIDAR device. The LIDAR device includes a transmitter, a receiving pixel, a rotating mirror, and a beam displacement apparatus. The transmitter is configured to emit a transmit beam. The receiving pixel is configured to receive a returning beam. The rotating mirror is configured to direct the transmit beam to a target and direct the returning beam to the receiving pixel. The beam displacement apparatus is configured to introduce a displacement to the returning beam to compensate for a spacing between the transmitter and the receiving pixel.

In an implementation, the beam displacement apparatus is configured to compensate for a reflection angle difference between the transmit beam and the returning beam reflecting off of the rotating mirror.

In an implementation, the beam displacement apparatus includes a beam displacer element including a birefringent material and the transmit beam has a first polarization orientation as the transmit beam encounters the beam displacement element. The birefringent material introduces the displacement to a second polarization orientation of the returning beam that is orthogonal to the first polarization orientation of the transmit beam.

In an implementation, beam displacement apparatus includes a beam rotator disposed between the transmitter and the beam displacer element and the beam rotator is configured to rotate a transmit polarization of the transmit beam so that the transmit polarization of the transmit beam is perpendicular to an optical axis of the beam displacer element.

In an implementation, the beam rotator is a switchable beam rotator and the rotating mirror is configured to rotate a first direction and a second opposite direction during regular operation. The switchable beam rotator is driven to a first retardation value when the rotating mirror is rotating in the first direction and driven to a second retardation value when the rotating mirror is rotating in the second opposite direction.

Implementations of the disclosure include an autonomous vehicle that includes transmitters, receiving pixels, a rotating mirror, and a beam displacement apparatus, and a control system configured to control the autonomous vehicle in response to the infrared returning beams. The transmitters are configured to emit infrared transmit beams. The receiving pixels are configured to receive infrared returning beams. The rotating mirror is configured to direct the infrared transmit beams to a target and direct the infrared returning beams to the receiving pixels. The beam displacement apparatus is disposed along on an optical path between the receiving pixels and the rotating mirror and the beam displacement apparatus is configured to introduce a displacement to the infrared returning beams to compensate for a spacing between the transmitters and the receiving pixels and configured to introduce the displacement to compensate for a reflection angle difference between the infrared transmit beams and the infrared returning beams reflecting off of the rotating mirror.

In an implementation, the beam displacement apparatus includes a beam displacer element including a birefringent material and the infrared transmit beams have a first polarization orientation as the infrared transmit beams encounter the beam displacement element. The birefringent material introduces the displacement to a second polarization orientation of the infrared returning beams that is orthogonal to the first polarization orientation of the infrared transmit beams.

In an implementation, the beam displacement apparatus includes a beam rotator disposed between the transmitters and the beam displacer element and the beam rotator is configured to rotate a transmit polarization of the infrared transmit beams so that the transmit polarization of the infrared transmit beams is perpendicular to an optical axis of the beam displacer element.

BRIEF DESCRIPTION OF THE DRAWINGS

Non-limiting and non-exhaustive implementations of the invention are described with reference to the following figures, wherein like reference numerals refer to like parts throughout the various views unless otherwise specified

DETAILED DESCRIPTION

Figure 1:
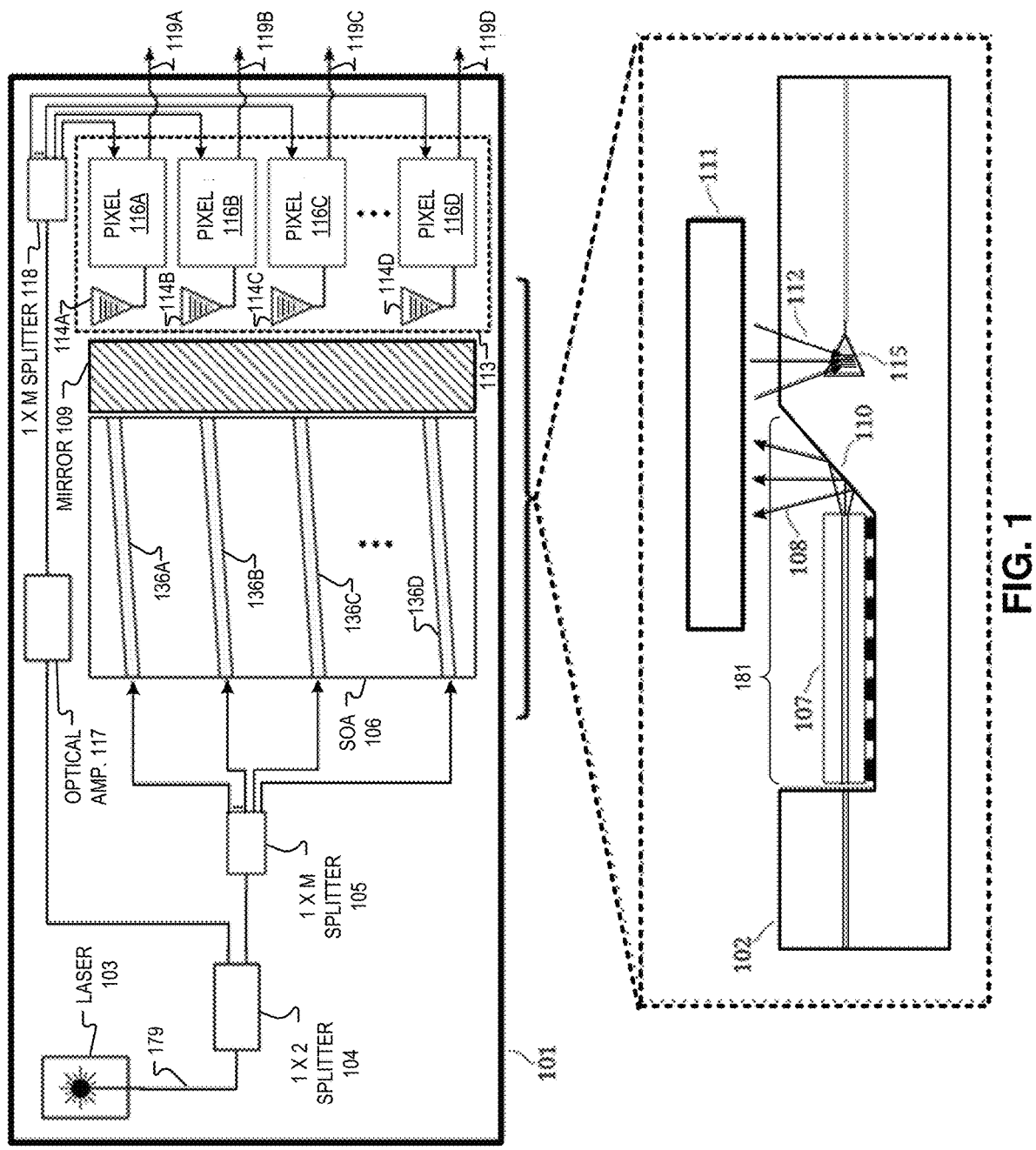
FIG. 1 illustrates a hybrid silicon/III-V photonics implementation of a solid state FMCW LIDAR system which leverages a beam displacement apparatus to implement a non-coaxial transmitter and receiver, in accordance with implementations of the disclosure.

Implementations of beam displacement for LIDAR are described herein. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Frequency Modulated Continuous Wave (FMCW) LIDAR directly measures range or velocity of an object by directing a frequency modulated, collimated light beam at the object. The light that is reflected from the object is combined with a tapped version of the beam. The frequency of the resulting beat tone is proportional to the distance of the object from the LIDAR system once corrected for the doppler shift that requires a second measurement. The two measurements, which may or may not be performed at the same time, provide both range and velocity information.

FMCW LIDAR can take advantage of integrated photonics for improved manufacturability and performance. Integrated photonic systems typically manipulate single optical modes using micron-scale waveguiding devices.

A LIDAR system may include of one or more continuously moving mirrors which steer the outgoing light towards a target at range and reflect the received light from that target into a receiver. Due to the transit time for light moving from the LIDAR to a target and back, the continuous motion of the mirror causes the received light to move away from the few-micron-sized transceiver. This "beam walk-off" effect can lead to a reduction in system performance.

FMCW LIDAR operation typically involves splitting the optical source power into a "local oscillator" (LO) component and a "signal" component. A simple integrated implementation of FMCW LIDAR involves co-locating the transmitter and receiver. This, however, may lead to additional loss as the receive optical power must pass back through the LO/signal splitter. In order to increase performance, it is desirable to separate the transmitter and receiver such that this splitter does not add additional loss to the optical system. In these implementations, the transmitter and receiver are non-coaxial and are spaced apart from each other.

In implementations of the disclosure, a LIDAR system includes a non-coaxial transmitter and receiving pixel, a rotating mirror, and a beam displacement apparatus configured to introduce a displacement to a returning beam to compensate for a spacing between the transmitter and the receiving pixel. The beam displacement apparatus may also be configured to compensate for a reflection angle difference between the transmit beam and the returning beam reflecting off of the rotating mirror. The beam displacer apparatus may include a beam displacer element including a birefringent material that introduces the displacement to a particular polarization orientation of the returning beam to direct the returning beam to the receiving pixel. The transmit beam and the returning beam (the transmit beam reflection/scattering off a target) may have a near-infrared wavelength.

In some implementations, the beam displacement apparatus includes a beam rotator that rotates a transmit polarization of the transmit beam (emitted by the transmitter). The beam rotator is a switchable beam rotator (e.g. switchable waveplate), in some implementations. The switchable beam rotator may be driven to a first retardation value (e.g. 0 degrees) when the rotating mirror is rotating in a first direction (e.g. clockwise) and driven to a second retardation value (e.g. 90 degrees) when the rotating mirror is rotating in a second opposite direction (e.g. counter-clockwise).

In some aspects of the disclosure, an apparatus is described for correcting beam walk-off in LIDAR applications which comprises a hybrid silicon/III-V or hybrid silicon/SiO2 platform. Light may be emitted from the transmitter array with polarization A which passes through a birefringent material. As the light passes through the birefringent material, the beam becomes offset relative to the source as a result of refraction. This light leaves the LIDAR system and reflects off of a diffuse surface at some distance from the system. Light reflected off of a diffuse surface may have its polarization randomized. The light in the polarization orthogonal to the emitted polarization (A) propagates back through the birefringent material, which introduces a different displacement to the beam compared to the emitted light. This beam illuminates an array of coherent pixels located in a silicon chip which receives the light in the polarization orthogonal to the transmitter. The birefringent material and geometry can be selected to choose a particular set of transmit and receive offsets which mitigate beam walk-off in LIDAR systems. The birefringent material and geometry can also be selected to choose a particular set of transmit and receive offsets which implements non-coaxial transmitters and receivers. These and other implementations are described in more detail in connection with FIGS. 1-5C.

FIG. 1 illustrates a hybrid silicon/III-V photonics implementation of a solid state FMCW LIDAR system which leverages a beam displacement apparatus 111 to implement a non-coaxial transmitter and receiver, in accordance with implementations of the disclosure. FIG. 1 depicts the top view of optical assembly 101 and a side view of the assembly 102. A laser 103 provides optical power to the system. Laser 103 may be solid state and co-packaged with the silicon chip 102 or external to the silicon chip 102. Light 179 emitted by laser 103 passes through a 1×2 splitter 104 which splits X % of the power into the bottom power and Y % of the power into the top port (typically X>>Y). The light coupled leaving the bottom port is routed into a 1×M splitter 105 which splits the power evenly between M output waveguides 136 in M channel semiconductor optical amplifier (SOA) 106/107 which boosts the optical power in each channel. FIG. 1 illustrates a plurality of waveguides 136A, 136B, 136C, and 136D (collectively referred to as waveguides 136) when M is integer 4, although M may be any integer number. SOA 106/107 is packaged in a recessed pocket 181 of the silicon chip 102. After amplification, the light is coupled out of the edge of SOA 106/107 and reflects off of an angled mirror 109/110 which is formed in the silicon chip 102 using, for example, a wet etch. The reflected beam of light (reflected by mirror 109/110) propagates vertically away from the silicon chip 102 as transmit beam 108, propagating through the beam displacement apparatus 111. Mirror 109/110 may be formed on an angled side-wall of recessed pocket 181 of silicon chip 102 that SOA 106/107 is disposed in. Beam displacement apparatus 111 may partially overhang recessed pocket 181 of silicon chip 102 to receive transmit beam 108 reflecting from mirror 110 on the angled side-wall.

After propagating through the beam displacement apparatus 111, transmit beam 108 propagates into the environment, reflects off of a target, and returns through the beam displacement apparatus 111 as returning beam 112. This returning beam 112 focuses onto one of the M receiving grating couplers 114/115 which feed an array of M silicon photonic coherent pixels 113. FIG. 1 illustrates a plurality of grating couplers 114A, 114B, 114C, and 114D (collectively referred to as grating couplers 114), although more or fewer grating couplers 114 may be included in the plurality. FIG. 1 illustrates a plurality of coherent pixels 116A, 116B, 116C, and 116D (collectively referred to as coherent pixels 116), although more or fewer coherent pixels 116 may be included in the plurality. The light is routed into each coherent pixel 116 where it is combined with the LO optical field.

The LO optical field is obtained from the optical power leaving the top port of splitter 104. In some implementations, this LO optical field may come from a separate laser source which has its own modulation. This light is routed to a second optical amplifier 117, which may be packaged in a similar manner as the SOA 106 or external to the chip. This amplified light is routed into a 1×M splitter 118, which evenly distributes the LO field between the M coherent pixels 116.

Each coherent pixel 116 mixes the receive optical field (generated by returning beam 112 incident onto the respective grating coupler) with the LO field and converts the resulting beat signal to an electrical signal 119 which is read out by the FMCW LIDAR system. FIG. 1 illustrates a plurality of electrical signals 119A, 119B, 119C, and 119D (collectively referred to as electrical signals 119), although more or fewer electrical signals 119 may be included in the plurality corresponding to the number M coherent pixels 116.

Figure 2:
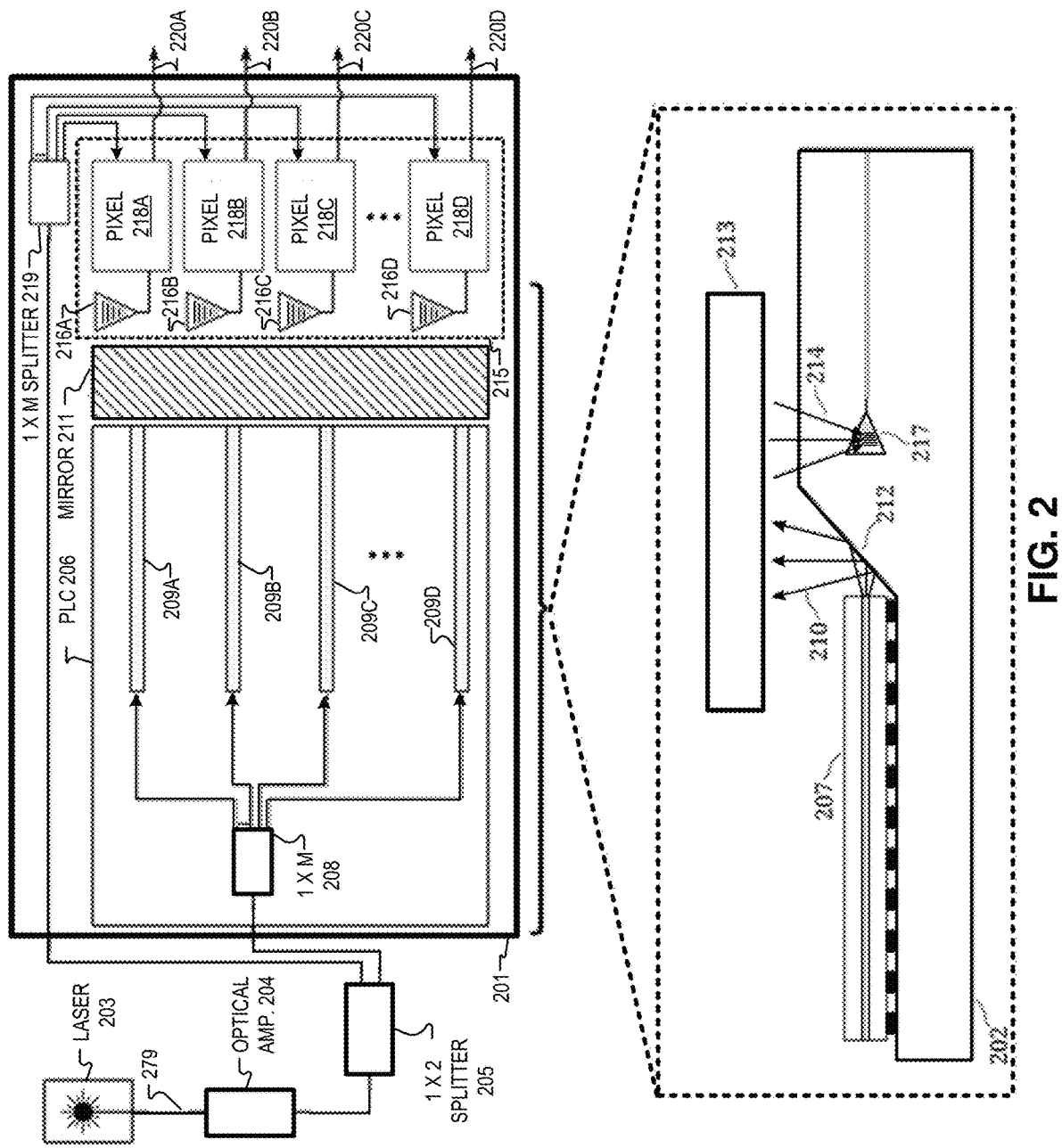
FIG. 2 illustrates a hybrid silicon/SiO$_2$ implementation of a solid state FMCW LIDAR system which leverages a beam displacement apparatus to implement a non-coaxial transmitter and receiver, in accordance with implementations of the disclosure.

FIG. 2 illustrates a hybrid silicon/$SiO_2$ implementation of a solid state FMCW LIDAR system which leverages a beam displacement apparatus 213 to implement a non-coaxial transmitter and receiver, in accordance with implementations of the disclosure. FIG. 2 depicts the top view of optical assembly 201 and a side view of the assembly 202. A laser 203 provides optical power to the system. Laser 203 may be solid state and co-packaged with the silicon chip 202 or external to the chip. Light 279 emitted by laser 203 passes through an optical amplifier 204 and then through a 1×2 splitter 205 which splits X % of the power into the bottom power and Y % of the power into the top port (typically X>>Y). Both optical amplifier 204 and 1×2 splitter 205 may be discrete fiber components or solid state components packaged with the silicon chip assembly 202. The light leaving the bottom port is routed into a glass planar lightwave circuit (PLC) 206/207 that includes a 1×M splitter 208 and M free-space edge couplers 209. In the illustration of FIG. 2, M is integer four and the four free-space edge couplers 209A, 209B, 209C, and 209D are collectively referred to as free-space edge couplers 209.

The light leaving the edge couplers 209 of PLC 206 reflects off of an angled mirror 211/212 which is formed in the silicon chip using, for example, a wet etch. The reflected beam of light (reflected by mirror 211/212) propagates vertically away from the silicon chip 202 as transmit beam 210, propagating through the beam displacement apparatus 213.

After propagating through the beam displacement apparatus 213, transmit beam 210 propagates into the environment, reflects off of a target, and returns through the beam displacement apparatus 213 as returning beam 214. This returning beam 214 focuses onto one of the M receiving grating couplers 216/217 which feed an array of M silicon photonic coherent pixels 215. FIG. 2 illustrates a plurality of grating couplers 216A, 216B, 216C, and 216D (collectively referred to as grating couplers 216), although more or fewer grating couplers 216 may be included in the plurality. FIG. 2 illustrates a plurality of coherent pixels 218A, 218B, 218C, and 218D (collectively referred to as coherent pixels 218), although more or fewer coherent pixels 218 may be included in the plurality. The light is routed into each coherent pixel 218 where it is combined with the LO optical field.

The LO optical field is obtained from the optical power leaving the top port of splitter 205. This light is routed into a silicon photonic 1×M splitter 219, which evenly distributes the LO field between the M coherent pixels 218.

Each coherent pixel 218, mixes the receive optical field (generated by returning beam 214 incident onto the respective grating coupler) with the LO field and converts the resulting beat signal to an electrical signal 220 which is read out by the FMCW LIDAR system. FIG. 2 illustrates a plurality of electrical signals 220A, 220B, 220C, and 220D (collectively referred to as electrical signals 220), although more or fewer electrical signals 220 may be included in the plurality corresponding to the number M coherent pixels 218.

Figure 3:
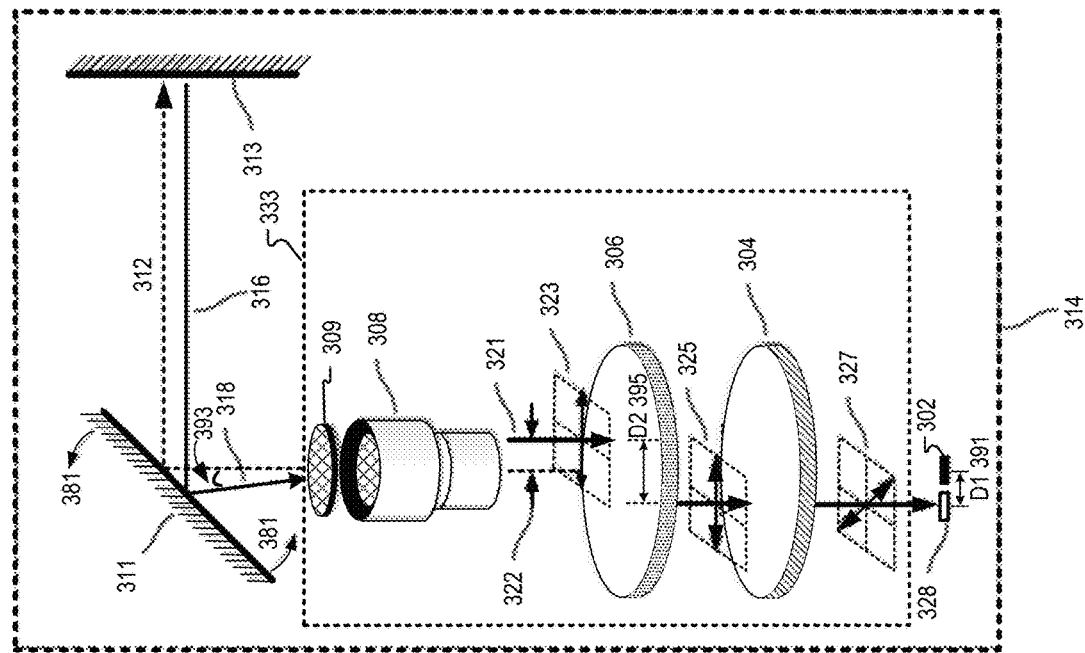
FIG. 3 illustrates an example beam displacement apparatus, in accordance with implementations of the disclosure.
Figure 3:
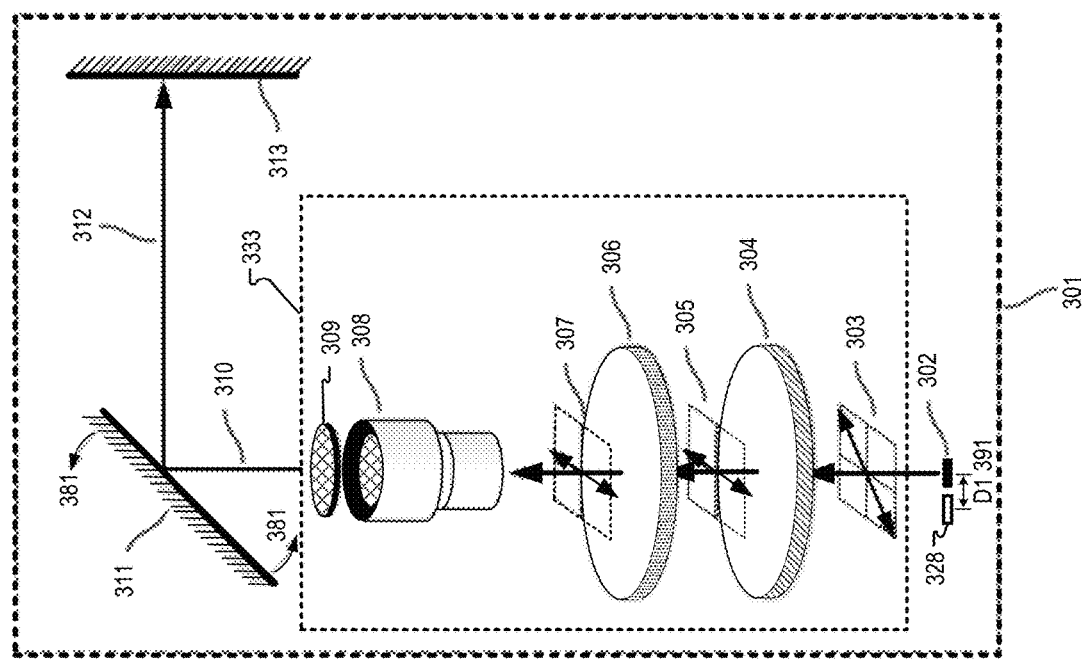

FIG. 3 illustrates an example beam displacement apparatus 333, in accordance with implementations of the disclosure. Example beam displacement apparatus may be used as beam displacement apparatus 111 or 213, for example. FIG. 3 illustrates the operation of the beam displacement apparatus for the purpose of implementing no-coaxial transmitters and receivers in FMCW LIDAR as well as for correcting beam walkoff. The operation of beam displacement apparatus 333 can be described with respect to transmit path 301 and receive path 314.

In transmit path 301, transmitter 302 emits transmit beam 303 with a particular polarization. Transmit beam 303 may be laser light 179/279 generated by laser 103/203, for example. Transmit beam 303 may be infrared light. In some implementations, transmit beam 303 is near-infrared light. The depicted location of transmitter 302 may be co-located with mirror 110 or 212, in some implementations. In the illustration of FIG. 3, the transmit polarization of transmit beam 303 is 45 degrees, however, this initial polarization can be different in different implementations. Transmit beam 303 propagates through an optional beam rotator 304, which rotates the transmit polarization, depicted by transmit beam 305, such that it is perpendicular to the optical axis of beam displacer element 306. Optional beam rotator 304 can be implemented using a half wave plate or other anisotropic crystal. Beam displacer element 306 is disposed between transmitter 302 and rotating mirror 311, in FIG. 3.

After propagating through beam displacer element 306, transmit beam 307 propagates along its original axis and its polarization is unchanged (when compared to the illustration of transmit beam 305). Transmit beam 307 enters lens 308 which is disposed between beam displacer element 306 and rotating mirror 311, in FIG. 3. Lens 308 may collimate the light and steer it in the desired direction. Lens 308 can be implemented using one or more bulk optic lens elements, micro lenses, or thin diffraction gratings. After propagating through lens 308, the light may propagate through an optional waveplate 309 disposed between beam displacement element 306 and rotating mirror 311. Waveplate 309 may be a quarter waveplate configured to shift the polarization axis of incident light by 45 degrees. Therefore, incident linearly polarized light may be converted to circularly polarized light by waveplate 309. Likewise, incident circularly polarized light may be converted to linearly polarized light by waveplate 309. Waveplate 309 may be made of birefringent materials such as quartz, organic material sheets, or liquid crystal, for example.

In the illustrated implementation, this circularly polarized transmit beam 310, reflects off of rotating mirror 311. Rotating mirror 311 may be a continuously rotating mirror that rotates in a particular direction 381 (e.g. counterclockwise direction 381 in FIG. 3). Rotating mirror 311 is configured to direct the transmit beam 310 to a target 313 in the environment of the LIDAR system or device. Rotating mirror 311 is also configured to direct a returning beam to one or more receiving pixels 328 in receive path 314.

After striking a target in the environment, the transmit beam returns as returning beam 316, as illustrated in receive path 314 of FIG. 3. In other words, returning beam 316 is transmit beam 312 reflecting/scattering off of target 313. Hence, returning beam 316 may have the same wavelength as transmit beam 312.

Returning beam 316 reflecting/scattering off of target 313 propagates back to rotating mirror 311. In the time it took for the light to propagate to target 313 and back, the rotating mirror 311 has rotated by a small amount in direction 381. As a result, the light of returning beam 316 reflects off of rotating mirror 311 at a small angle (reflection angle difference 393) relative to the light propagating along the transmit path 301, as shown by returning beam 318. Returning beam 318 propagates to beam displacement apparatus 333 disposed between receiving pixel 328 and rotating mirror 311. Beam displacement apparatus 333 is configured to introduce a displacement D2 395 to the returning beam to compensate for a spacing 391 between transmitter 302 and receiving pixel 328. In FIG. 3, beam displacement apparatus 333 is also configured to compensate for reflection angle difference 393 between the transmit beam 310 and the returning beam 318 reflecting off of the rotating mirror 311.

This light passes back through quarter waveplate 309. If the target surface maintained the incident polarization, then the returning beam exiting quarter waveplate 309 will result in a linear polarization that is perpendicular to the polarization leaving the lens in the transmit direction. If the target randomized the polarization, then the polarization of the returning beam exiting quarter waveplate 309 includes both the transmit polarization and the perpendicular polarization. This light passes back through the lens 308. Because of the small change in angle of the mirror (reflection angle difference 393), the returning beam enters lens 308 at a small angle, which translates into a small offset, or "beam walkoff" 322 in position of returning beam 321 beneath the lens relative to the transmit path. A component of this returning beam's polarization orientation 323 will have a non-zero projection onto the optical axis of the beam displacer element 306. This causes the returning beam to be displaced by a fixed displacement amount 395 as it propagates through beam displacer element 306. The beam displacer element 306 parameters (e.g. material, thickness, optical axis orientation) can be chosen to yield a displacement dimension D2 395 that cancels (or at least adjusts for) the beam walkoff for a target at a specified distance. That is, beam displacement element 306 may be configured to compensate for the reflection angle difference 393 between the transmit beam 310 and the returning beam 318 reflection of the mirror. Furthermore, beam displacement element may be configured to yield displacement dimension D2 395 that also compensates for spacing 391 between the transmitter 302 and receiving pixel 328.

In some implementations, beam displacer element 306 includes a birefringent material. In some implementations, the birefringent material may be $LiNO_3$ (Lithium Nitrate). In some implementations, the birefringent material may be $YVO_4$ (Yttrium Orthovanadate). In some implementations, beam displacer element 306 does not include birefringent materials. In FIG. 3, transmit beam 305 has a first polarization orientation as transmit beam 305 encounters beam displacement element 306 and returning beam 323 has a second polarization orientation that is orthogonal to the first polarization orientation of transmit beam 305. The birefringent material of beam displacer element 306 may be selected/configured to introduce displacement dimension D2 395 to the second polarization orientation but not the first polarization orientation.

In some implementations, after passing through beam displacer element 306, the returning beam 325 now propagates along a similar axis as transmit beam 305 (that may be approximately parallel to the axis of transmit beam 305) but with a perpendicular polarization to the transmit polarization of transmit beam 305. In some implementations, the spacing between the axis of returning beam 325 and transmit beam 305 is approximately the same as spacing 391 between the transmitter 302 and receiving pixel 328. In some implementations, after passing through beam displacer element 306, the returning beam 325 now propagates along the same axis as the transmit beam but with a perpendicular polarization to the transmit polarization of transmit beam 305. Returning beam 325 propagates through optional beam rotator 304 (that is disposed between transmitter 302 and beam displacer element 306) which rotates the polarization by the desired amount to generate returning beam 327 having a polarization orientation that is orthogonal to transmit beam 303. Receiving pixel 328 is configured to receive returning beam 327.

Figure 4:
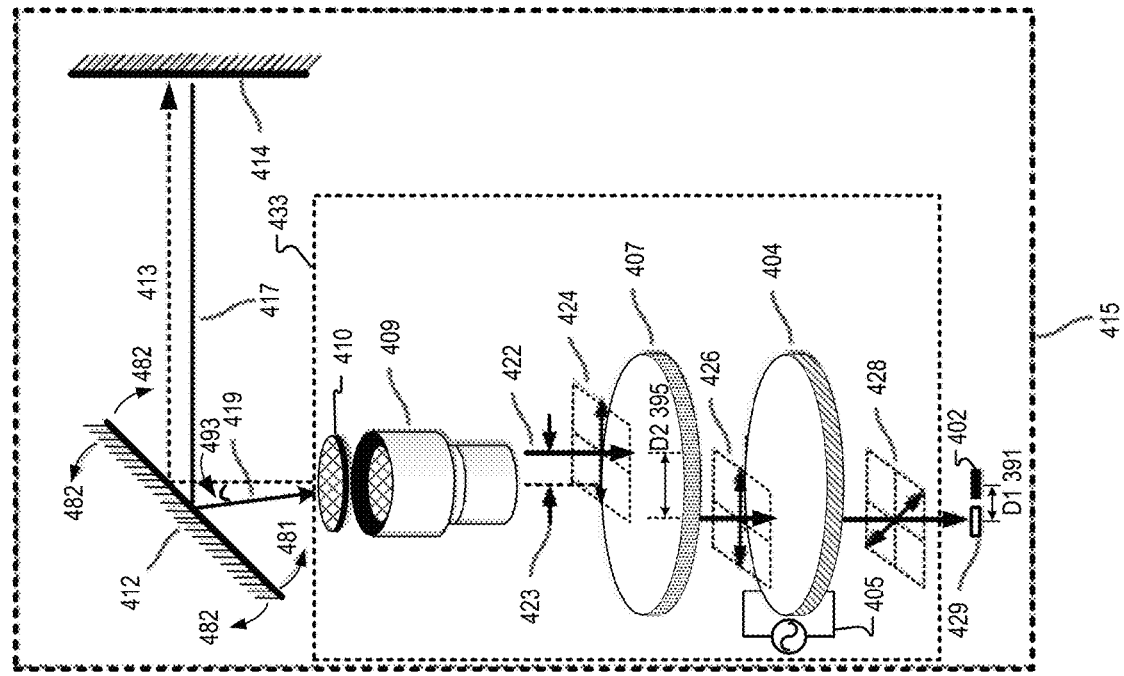
FIG. 4 illustrates an example beam displacement apparatus that includes a switchable beam rotator, in accordance with implementations of the disclosure.
Figure 4:
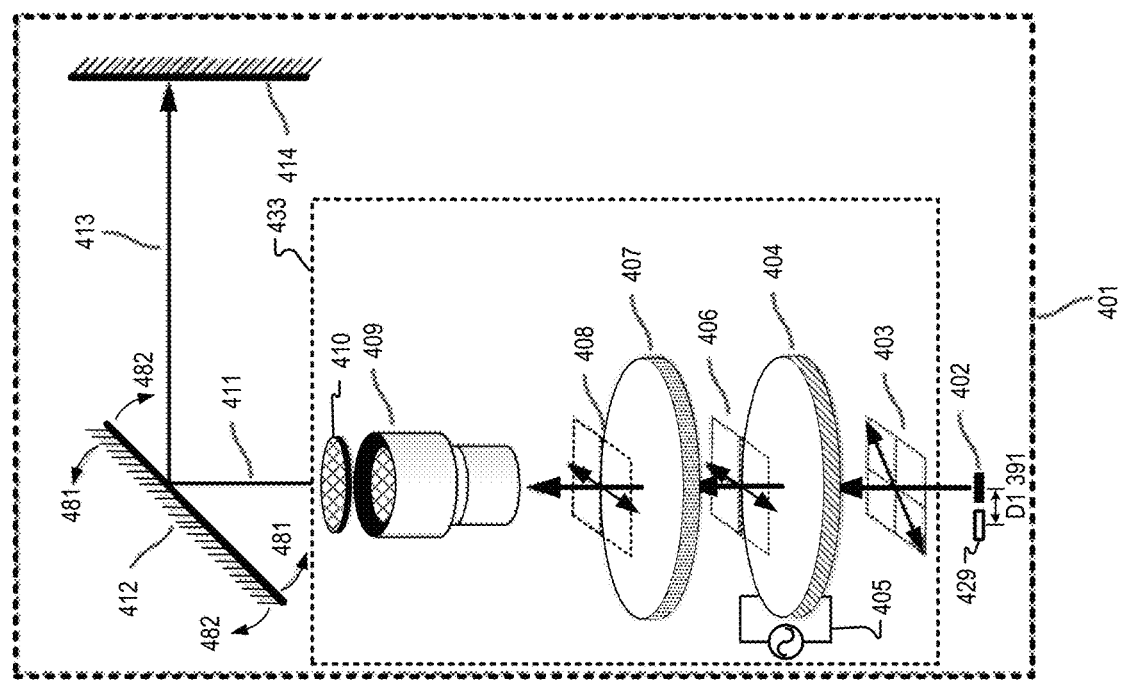

FIG. 4 illustrates an example beam displacement apparatus 433 that includes a switchable beam rotator 404, in accordance with implementations of the disclosure. Switchable beam rotator 404 is configured to change the beam displacement direction in response to electrical signal 405. Switchable beam rotator 404 may be a switchable half waveplate that includes liquid crystals.

In FIG. 4, the behavior of 401-404 and 406-429 are the same or similar to 601-628 except that switchable beam rotator 404 can be controlled using an electrical signal 405. Switchable beam rotator 404 may be driven to a first retardation value (e.g. 0 degrees) when the rotating mirror is rotating in a first direction (e.g. direction 481) and driven to a second retardation value (e.g. 90 degrees) when the rotating mirror is rotating in the second opposite direction (e.g. direction 482). Therefore, the polarization orientation of transmit beam 406 can be changed by 90 degrees dynamically, causing the beam to be displaced in different directions. This is useful in cases where the rotating mirror 412 rotates both clockwise (e.g. direction 482) and counterclockwise (e.g. direction 481) during regular operation (which reverses the walkoff direction).

Figure 5A:
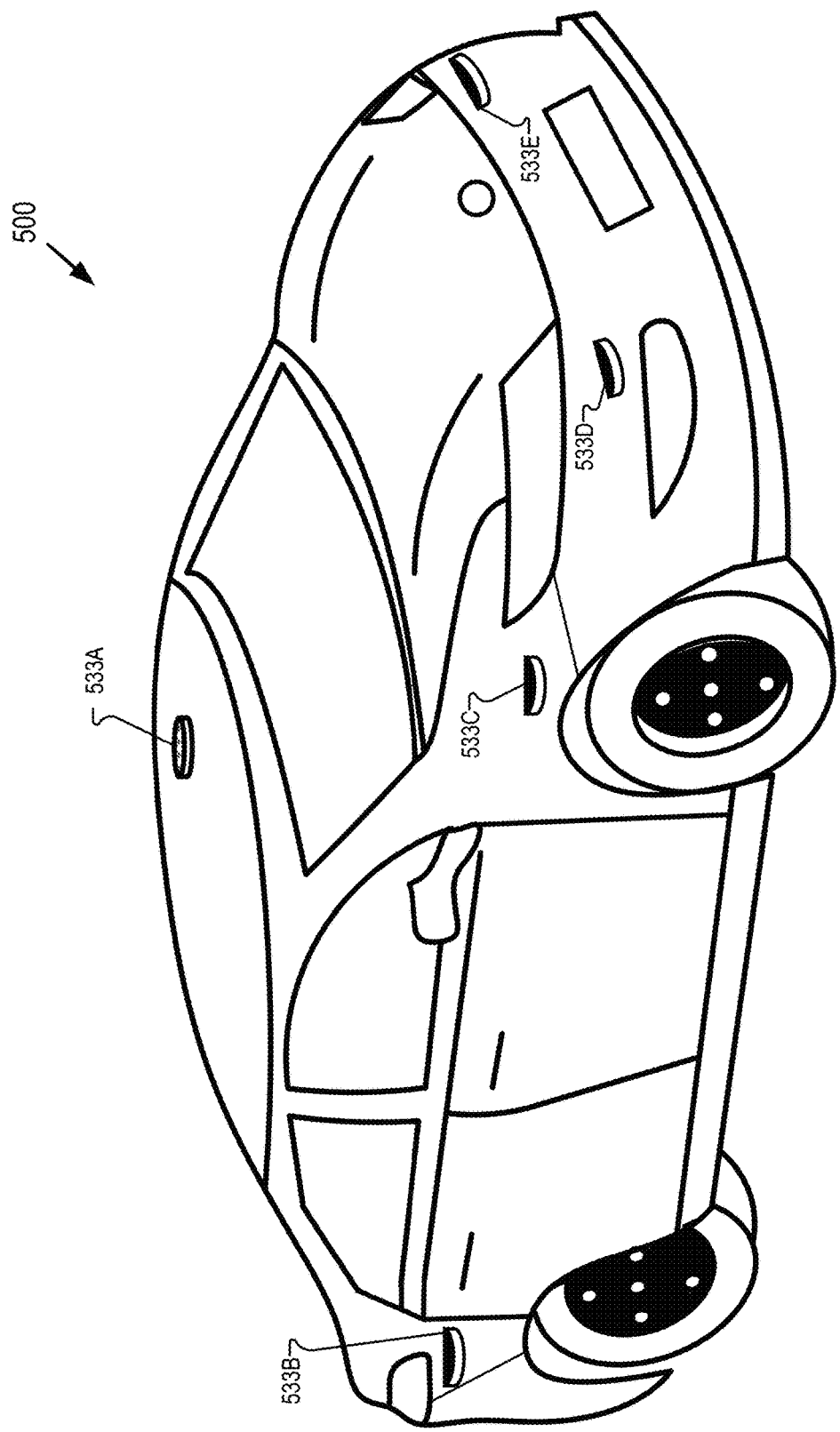
FIG. 5A illustrates an autonomous vehicle including an array of example sensors, in accordance with implementations of the disclosure.
Figure 5B:
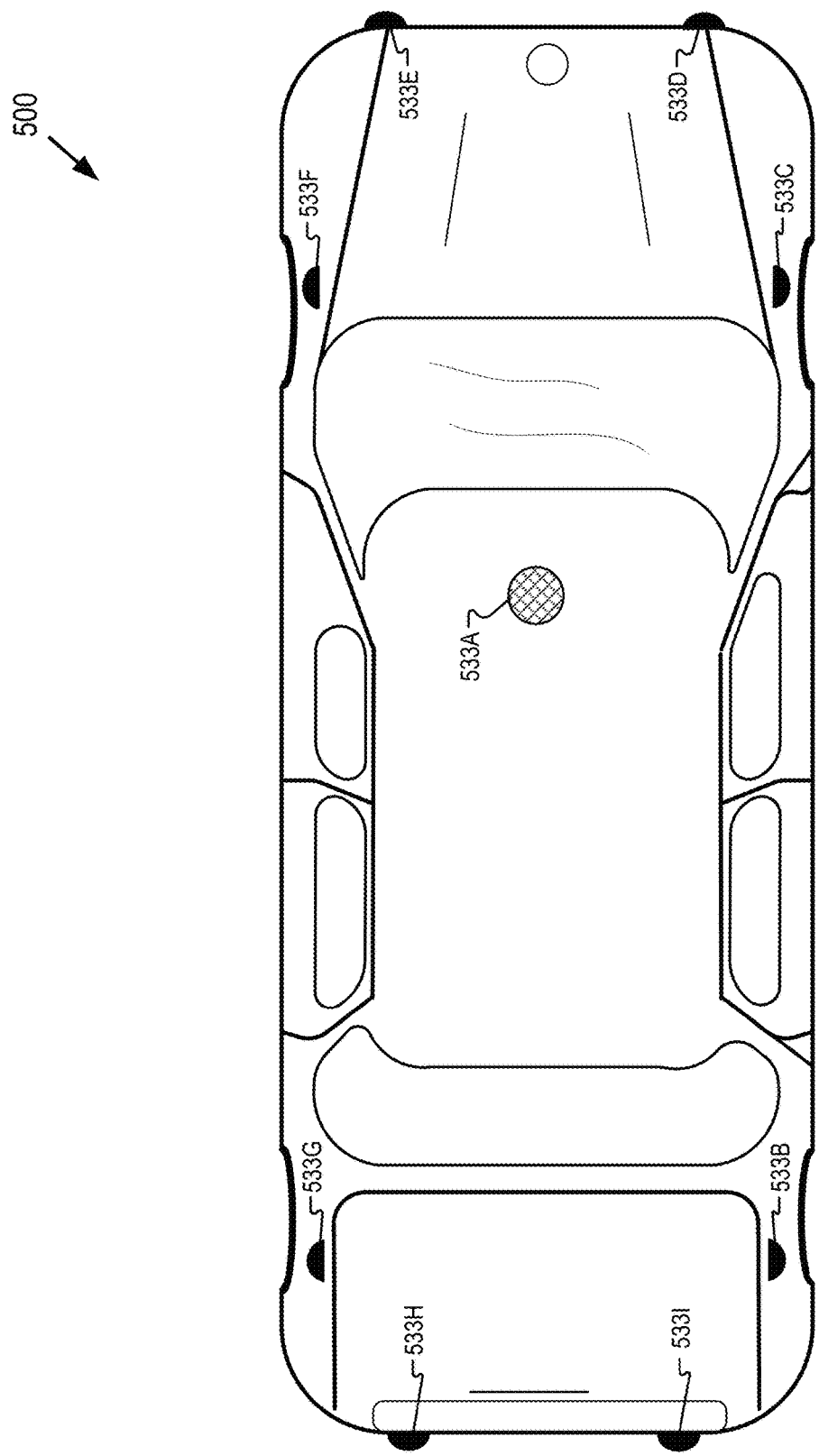
FIG. 5B illustrates a top view of an autonomous vehicle including an array of example sensors, in accordance with implementations of the disclosure.
Figure 5C:
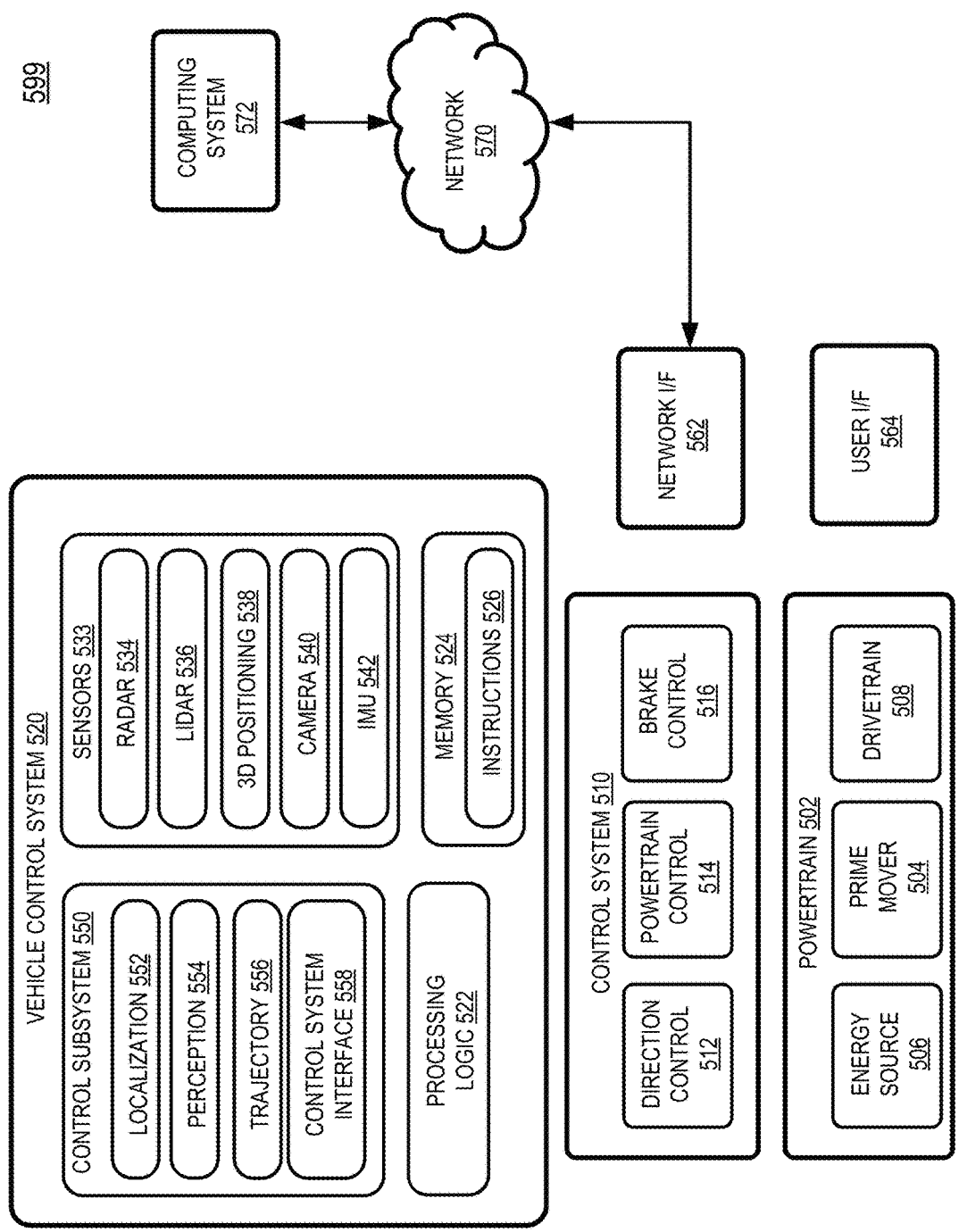
FIG. 5C illustrates an example vehicle control system including sensors, a drivetrain, and a control system, in accordance with implementations of the disclosure.

FIG. 5A illustrates an example autonomous vehicle 500 that may include the LIDAR designs of FIGS. 1-4, in accordance with aspects of the disclosure. The illustrated autonomous vehicle 500 includes an array of sensors configured to capture one or more objects of an external environment of the autonomous vehicle and to generate sensor data related to the captured one or more objects for purposes of controlling the operation of autonomous vehicle 500. FIG. 5A shows sensor 533A, 533B, 533C, 533D, and 533E. FIG. 5B illustrates a top view of autonomous vehicle 500 including sensors 533F, 533G, 533H, and 533I in addition to sensors 533A, 533B, 533C, 533D, and 533E. Any of sensors 533A, 533B, 533C, 533D, 533E, 533F, 533G, 533H, and/or 533I may include LIDAR devices that include the designs of FIGS. 1-4. FIG. 5C illustrates a block diagram of an example system 599 for autonomous vehicle 500. For example, autonomous vehicle 500 may include powertrain 502 including prime mover 504 powered by energy source 506 and capable of providing power to drivetrain 508. Autonomous vehicle 500 may further include control system 510 that includes direction control 512, powertrain control 514, and brake control 516. Autonomous vehicle 500 may be implemented as any number of different vehicles, including vehicles capable of transporting people and/or cargo and capable of traveling in a variety of different environments. It will be appreciated that the aforementioned components 502-516 can vary widely based upon the type of vehicle within which these components are utilized.

The implementations discussed hereinafter, for example, will focus on a wheeled land vehicle such as a car, van, truck, or bus. In such implementations, prime mover 504 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 508 may include wheels and/or tires along with a transmission and/or any other mechanical drive components suitable for converting the output of prime mover 504 into vehicular motion, as well as one or more brakes configured to controllably stop or slow the autonomous vehicle 500 and direction or steering components suitable for controlling the trajectory of the autonomous vehicle 500 (e.g., a rack and pinion steering linkage enabling one or more wheels of autonomous vehicle 500 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 512 may include one or more actuators and/or sensors for controlling and receiving feedback from the direction or steering components to enable the autonomous vehicle 500 to follow a desired trajectory. Powertrain control 514 may be configured to control the output of powertrain 502, e.g., to control the output power of prime mover 504, to control a gear of a transmission in drivetrain 508, thereby controlling a speed and/or direction of the autonomous vehicle 500. Brake control 516 may be configured to control one or more brakes that slow or stop autonomous vehicle 500, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls, and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 500 is implemented in vehicle control system 520, which may include one or more processors in processing logic 522 and one or more memories 524, with processing logic 522 configured to execute program code (e.g. instructions 526) stored in memory 524. Processing logic 522 may include graphics processing unit(s) (GPUs) and/or central processing unit(s) (CPUs), for example. Vehicle control system 520 may be configured to control powertrain 502 of autonomous vehicle 500 in response to the returning beams (e.g. returning beams 316 or 417) or in response to signals 119 or 120. Vehicle control system 520 may be configured to control powertrain 502 of autonomous vehicle 500 in response to outputs from a plurality of LIDAR pixels.

Sensors 533A-533I may include various sensors suitable for collecting data from an autonomous vehicle's surrounding environment for use in controlling the operation of the autonomous vehicle. For example, sensors 533A-533I can include RADAR unit 534, LIDAR unit 536, 3D positioning sensor(s) 538, e.g., a satellite navigation system such as GPS, GLONASS, BeiDou, Galileo, or Compass. The LIDAR designs of FIGS. 1-4 may be included in LIDAR unit 536. LIDAR unit 536 may include a plurality of LIDAR sensors that are distributed around autonomous vehicle 500, for example. In some implementations, 3D positioning sensor(s) 538 can determine the location of the vehicle on the Earth using satellite signals. Sensors 533A-533I can optionally include one or more ultrasonic sensors, one or more cameras 540, and/or an Inertial Measurement Unit (IMU) 542. In some implementations, camera 540 can be a monographic or stereographic camera and can record still and/or video images. Camera 540 may include a Complementary Metal-Oxide-Semiconductor (CMOS) image sensor configured to capture images of one or more objects in an external environment of autonomous vehicle 500. IMU 542 can include multiple gyroscopes and accelerometers capable of detecting linear and rotational motion of autonomous vehicle 500 in three directions. One or more encoders (not illustrated) such as wheel encoders may be used to monitor the rotation of one or more wheels of autonomous vehicle 500.

The outputs of sensors 533A-533I may be provided to control subsystems 550, including, localization subsystem 552, trajectory subsystem 556, perception subsystem 554, and control system interface 558. Localization subsystem 552 is configured to determine the location and orientation (also sometimes referred to as the "pose") of autonomous vehicle 500 within its surrounding environment, and generally within a particular geographic area. The location of an autonomous vehicle can be compared with the location of an additional vehicle in the same environment as part of generating labeled autonomous vehicle data. Perception subsystem 554 may be configured to detect, track, classify, and/or determine objects within the environment surrounding autonomous vehicle 500. Trajectory subsystem 556 is configured to generate a trajectory for autonomous vehicle 500 over a particular timeframe given a desired destination as well as the static and moving objects within the environment. A machine learning model in accordance with several implementations can be utilized in generating a vehicle trajectory. Control system interface 558 is configured to communicate with control system 510 in order to implement the trajectory of the autonomous vehicle 500. In some implementations, a machine learning model can be utilized to control an autonomous vehicle to implement the planned trajectory.

It will be appreciated that the collection of components illustrated in FIG. 5C for vehicle control system 520 is merely exemplary in nature. Individual sensors may be omitted in some implementations. In some implementations, different types of sensors illustrated in FIG. 5C may be used for redundancy and/or for covering different regions in an environment surrounding an autonomous vehicle. In some implementations, different types and/or combinations of control subsystems may be used. Further, while subsystems 552-558 are illustrated as being separate from processing logic 522 and memory 524, it will be appreciated that in some implementations, some or all of the functionality of subsystems 552-558 may be implemented with program code such as instructions 526 resident in memory 524 and executed by processing logic 522, and that these subsystems 552-558 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 520 may be networked in various manners.

In some implementations, autonomous vehicle 500 may also include a secondary vehicle control system (not illustrated), which may be used as a redundant or backup control system for autonomous vehicle 500. In some implementations, the secondary vehicle control system may be capable of operating autonomous vehicle 500 in response to a particular event. The secondary vehicle control system may only have limited functionality in response to the particular event detected in primary vehicle control system 520. In still other implementations, the secondary vehicle control system may be omitted.

In some implementations, different architectures, including various combinations of software, hardware, circuit logic, sensors, and networks may be used to implement the various components illustrated in FIG. 5C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 500, e.g., any cache memory in a processor, as well as any storage capacity used as a virtual memory, e.g., as stored on a mass storage device or another computer controller. Processing logic 522 illustrated in FIG. 5C, or entirely separate processing logic, may be used to implement additional functionality in autonomous vehicle 500 outside of the purposes of autonomous control, e.g., to control entertainment systems, to operate doors, lights, or convenience features.

In addition, for additional storage, autonomous vehicle 500 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 500 may include a user interface 564 to enable autonomous vehicle 500 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 500 may include one or more network interfaces, e.g., network interface 562, suitable for communicating with one or more networks 570 (e.g., a Local Area Network ("LAN"), a wide area network ("WAN"), a wireless network, and/or the Internet, among others) to permit the communication of information with other computers and electronic devices, including, for example, a central service, such as a cloud service, from which autonomous vehicle 500 receives environmental and other data for use in autonomous control thereof. In some implementations, data collected by one or more sensors 533A-533I can be uploaded to computing system 572 through network 570 for additional processing. In such implementations, a time stamp can be associated with each instance of vehicle data prior to uploading.

Processing logic 522 illustrated in FIG. 5C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 500 through network 570, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 5C is not intended to limit implementations disclosed herein. Indeed, those skilled in the art will recognize that other alternative hardware and/or software environments may be used without departing from the scope of implementations disclosed herein.

The term "processing logic" (e.g. processing logic 522) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A light detection and ranging (LIDAR) system comprising a silicon chip that includes:
   a transmitter configured to emit a transmit beam;
   a receiving pixel that includes a grating coupler and is configured to receive a returning beam through the grating coupler;
   a rotating mirror configured to direct the transmit beam to an object and direct the returning beam to the receiving pixel;
   a beam displacement apparatus disposed between the receiving pixel and the rotating mirror, wherein the beam displacement apparatus is configured to introduce a displacement to the returning beam to compensate for a spacing between the transmitter and the receiving pixel, wherein the beam displacement apparatus includes a switchable beam rotator; and
   a fixed mirror configured to direct the transmit beam to the beam displacement apparatus from the transmitter.

2. The LIDAR system of claim 1, wherein the beam displacement apparatus is configured to compensate for a reflection angle difference between the transmit beam and the returning beam reflecting from the rotating mirror.

3. The LIDAR system of claim 1, wherein the beam displacement apparatus includes a beam displacer element including a birefringent material, and wherein the birefringent material introduces the displacement with a second polarization orientation of the returning beam that is defined with reference to a first polarization orientation of the transmit beam.

4. The LIDAR system of claim 3, wherein the switchable beam rotator is disposed between the transmitter and the beam displacer element, and wherein the switchable beam rotator is configured to rotate a transmit polarization of the transmit beam.

5. The LIDAR system of claim 4, wherein the rotating mirror is configured to rotate in a first direction or in a second opposite direction alternatively during a regular.

6. The LIDAR system of claim 4, wherein the beam displacement apparatus includes a waveplate disposed between the beam displacer element and the rotating mirror.

7. The LIDAR system of claim 6, wherein the waveplate is a quarter waveplate.

8. The LIDAR system of claim 4, wherein the beam displacement apparatus includes a lens disposed between the beam displacer element and the rotating mirror, wherein the lens is configured to collimate the transmit beam.

9. The LIDAR system of claim 1, wherein the returning beam is the transmit beam reflecting from the object.

10. The LIDAR system of claim 1, wherein the transmitter includes at least one edge coupler, wherein the fixed mirror is configured to receive the transmit beam from the at least one edge coupler, wherein the fixed mirror is angled to direct the transmit beam vertically from a surface of the silicon chip.

11. The LIDAR system of claim 1, wherein the switchable beam rotator is configured to change a polarization orientation of the transmit beam based on a direction of rotation of the rotating mirror.

12. An autonomous vehicle control system for an autonomous vehicle, the autonomous vehicle control system comprising:
   a light detection and ranging (LIDAR) device including:
      a silicon chip including:
         a transmitter configured to emit a transmit beam;
         a receiving pixel that includes a grating coupler and is configured to receive a returning beam through the grating coupler; and
         a fixed mirror configured to receive and redirect the transmit beam;

a rotating mirror configured to direct the transmit beam to an object and direct the returning beam to the receiving pixel; and a beam displacement apparatus configured to introduce a displacement to the returning beam to compensate for a spacing between the transmitter and the receiving pixel, wherein the beam displacement apparatus includes a switchable beam rotator, wherein the fixed mirror is configured to direct the transmit beam from the transmitter to the beam displacement apparatus from the silicon chip; and one or more processors configured to control the autonomous vehicle in response to an output of the receiving pixel.

13. The autonomous vehicle control system of claim 12, wherein the beam displacement apparatus is configured to compensate for a reflection angle difference between the transmit beam and the returning beam reflecting from the rotating mirror.

14. The autonomous vehicle control system of claim 12, wherein the beam displacement apparatus includes a beam displacer element including a birefringent material, and wherein the birefringent material introduces the displacement with a second polarization orientation of the returning beam that is defined with reference to a first polarization orientation of the transmit beam.

15. The autonomous vehicle control system of claim 14, wherein the switchable beam rotator is disposed between the transmitter and the beam displacer element, and wherein the switchable beam rotator is configured to rotate a transmit polarization of the transmit beam.

16. The autonomous vehicle control system of claim 15, wherein the rotating mirror is configured to rotate in a first direction or in a second opposite direction alternatively during a regular operation.

17. An autonomous vehicle comprising:
at least one silicon chip including:
transmitters configured to emit infrared transmit beams;
receiving pixels configured to receive infrared returning beams, wherein at least one of the receiving pixels includes a grating coupler, wherein the at least one of the receiving pixels is configured to receive at least one of the infrared returning beams through the grating coupler; and
at least one fixed mirror configured to receive and redirect the infrared transmit beams;

a rotating mirror configured to direct the infrared transmit beams to an object and direct the infrared returning beams to the receiving pixels;

a beam displacement apparatus disposed along on an optical path between the receiving pixels and the rotating mirror, wherein the beam displacement apparatus is configured to introduce a displacement to the infrared returning beams to compensate for a spacing between the transmitters and the receiving pixels and configured to introduce the displacement to compensate for a reflection angle difference between the infrared transmit beams and the infrared returning beams reflecting off of the rotating mirror, wherein the beam displacement apparatus includes a switchable beam rotator, wherein the at least one fixed mirror is configured to direct the infrared transmit beams from the transmitters to the beam displacement apparatus from the at least one silicon chip; and a control system configured to control the autonomous vehicle in response to the infrared returning beams.

18. The autonomous vehicle of claim 17, wherein the beam displacement apparatus includes a beam displacer element including a birefringent material, and wherein the birefringent material introduces the displacement with a second polarization orientation of the infrared returning beams that is defined with reference to a first polarization orientation of the infrared transmit beams.

19. The autonomous vehicle of claim 18, wherein the switchable beam rotator is disposed between the transmitters and the beam displacer element, and wherein the switchable beam rotator is configured to rotate a transmit polarization of the infrared transmit beams.

* * * * *